Aug. 27, 1940.  H. W. POUND ET AL  2,212,885
SELF-CLEANING ELECTRIC GAS CLEANER
Filed April 13, 1939  4 Sheets-Sheet 1

HOWARD W. POUND
MERLE K. RUSH   INVENTORS.

BY Arthur J. Robert
ATTORNEY.

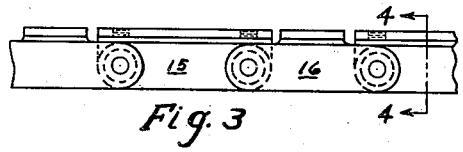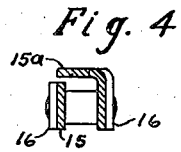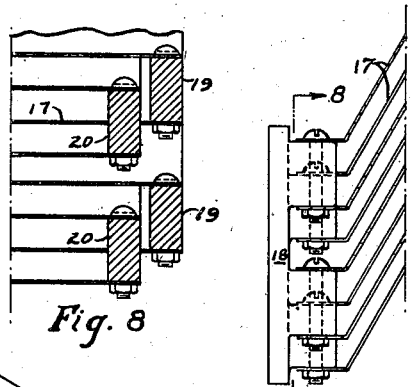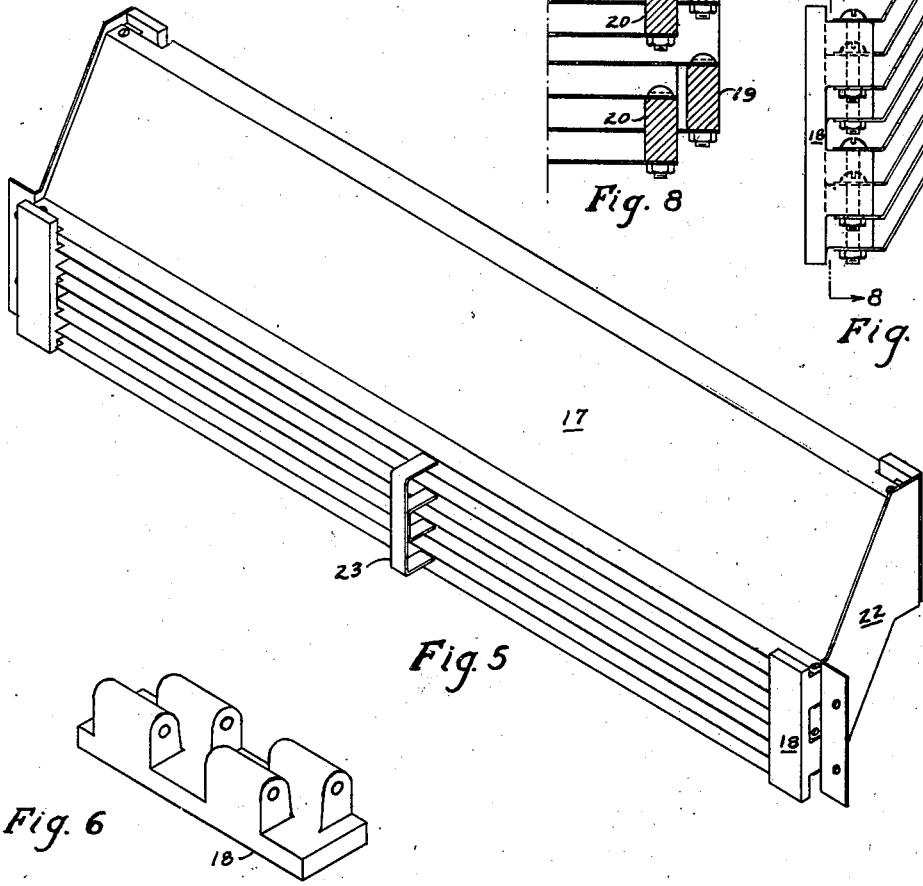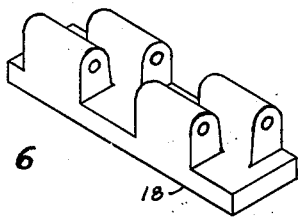

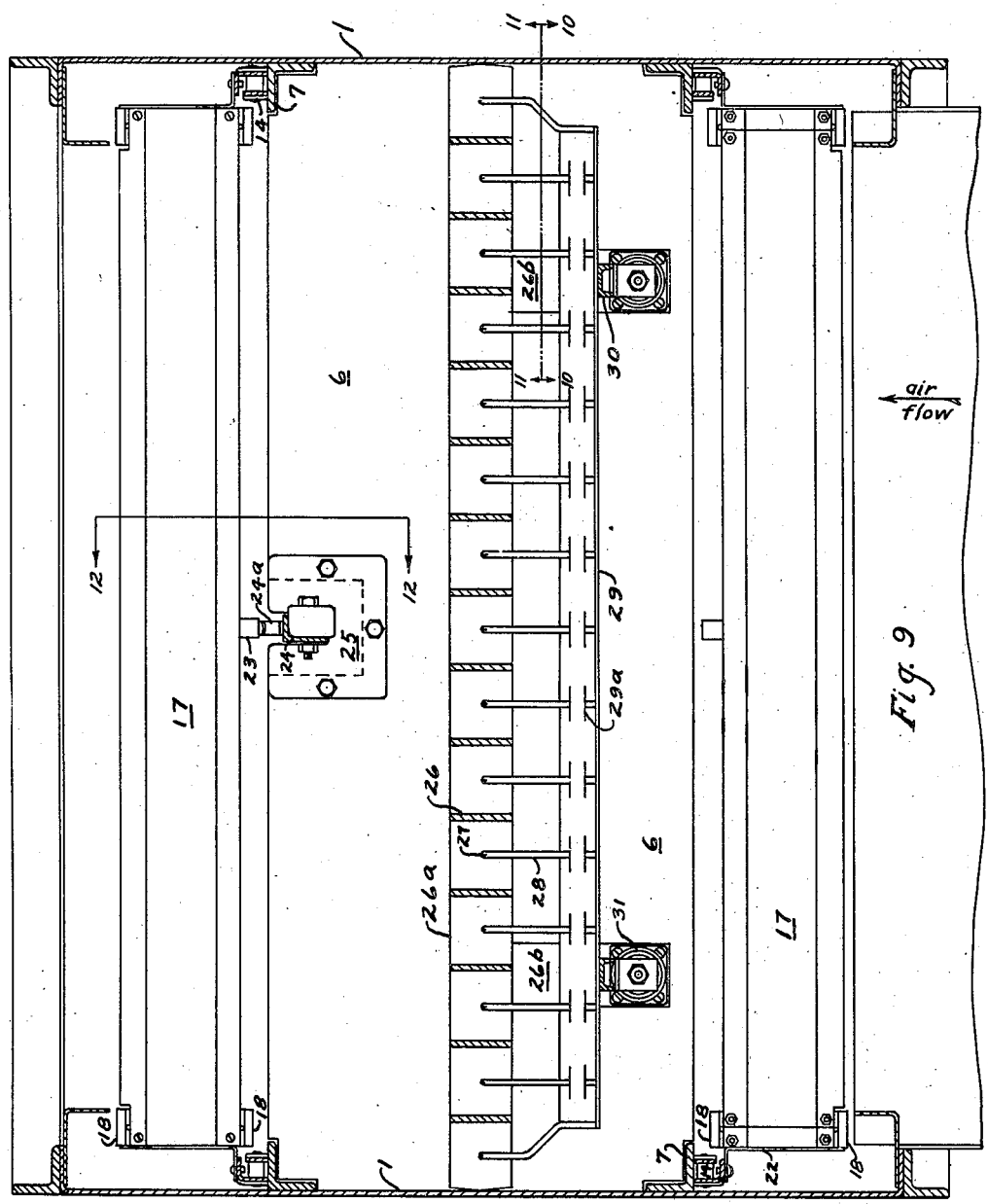

Aug. 27, 1940.   H. W. POUND ET AL   2,212,885
SELF-CLEANING ELECTRIC GAS CLEANER
Filed April 13, 1939   4 Sheets-Sheet 4

HOWARD W. POUND
MERLE K. RUSH
INVENTORS.

BY *Arthur J. Robert*
ATTORNEY.

Patented Aug. 27, 1940

2,212,885

UNITED STATES PATENT OFFICE 2,212,885

SELF-CLEANING ELECTRIC GAS CLEANER

Howard W. Pound and Merle K. Rush, Louisville, Ky., assignors to American Air Filter Company, Inc., Louisville, Ky., a corporation of Delaware Application April 13, 1939, Serial No. 267,562

15 Claims. (Cl. 183—7)

At the outset, it is well to understand the difference between process and atmospheric dust. Process dust may be defined as the dust generated during, and as a result of, some industrial operation such as mining or manufacturing. Atmospheric dust is the dust in the atmosphere. Process dust, if permitted to escape, pollutes the atmosphere. Atmospheric dust is the result of that and other pollutions.

In the electrical gas-cleaning art, which is largely concerned with the removal of extremely minute or microscopic process and atmospheric dust particles, two gas-ionizing methods are largely employed at the present time, namely: the Cottrell method and the pre-ionizing method. In the Cottrell method, as disclosed in Cottrell Patent #1,035,422, an electrostatic field, of sufficient intensity to effect both the ionization of the gas and the electrical precipitation of the particles, is created and maintained throughout an extensive air-flow depth. In the pre-ionizing method, as disclosed in such patents as Schmidt #1,343,285, Moller #1,357,466, and Penny #2,129,783, separate electrostatic ionizing and precipitating fields are created, the ionizing field being shallow and the precipitating field of appreciable but not necessarily of extensive depth.

The Cottrell method is not suited for use in the removal of atmospheric dust particles from ventilating air because of the ozone generated as a result of the high operating voltages necessarily employed to produce an electrostatic field sufficiently intense to effect both ionization and precipitation. It is suited for use in the removal of process dust particles since ozone is not usually a deterring factor in the collection of process dust. Cottrell process dust cleaners are necessarily bulky because the high operating voltages (i. e., 30,000—80,000) necessitate wide spacing between electrodes, while wide spacing maximizes the electrode-gas contact time required to effect precipitation; hence promotes the use of low gas velocities, and deep electrodes, i. e., long in the direction of air flow.

The pre-ionizing method is suited for use in the removal of both process and atmospheric dust particles because it permits the use of lower ionizing voltages (i. e., 11,600–12,400) and still lower precipitating voltages (i. e., 5,300–5,700), and thereby avoids the harmful generation of ozone. It can be made compact because the lower ionizing voltages permit the use of more narrowly spaced shallow ionizing electrodes, while the still lower precipitating voltages permit the use of closely spaced precipitating electrodes which minimize the electrode-gas contact time; hence promotes the use of high gas velocities and short, but not shallow, electrodes, i. e., electrodes which are much shorter than combined ionizing and precipitating electrodes and yet longer than the shallow ionizing electrodes.

With the precipitation of dust accomplished in any electrical gas cleaner, the problem of its removal from the collecting surfaces or electrodes is presented. Up to the present time, this has been done largely by "shutting down" the cleaner and then jarring, brushing, vacuum cleaning, scraping or similarly dislodging the precipitated dust from the collecting surface or by spraying such surfaces so as to wash the dust therefrom. To avoid "shut downs," automatic or self-cleaning process dust cleaners have been proposed in such patents as: Girvin #1,252,102, Chubb #1,349,362, Kennard No. 1,394,771, Hopkinson #1,575,165, Winchester #1,822,074, Day #1,869,-335, and Paterniti #1,869,772. These arrangements take advantage of the liberties, in structure and operation, permitted by the wide electrode spacings of Cottrell cleaners. They are not, therefore, readily applicable to the narrow electrode spacings of pre-ionizing cleaners as indicated in the Nesbit Patent #1,888,606. The extremely vexatious difficulties and complexities which characterize present-day cleaning methods are discussed in such patents as Horne #1,800,529 and Meston #1,903,644. In summary, it may be said that the cleaning methods proposed for electrical cleaners generally have been so highly unsatisfactory that a large part of the time and effort spent by those actively engaged in the general development of this art have been necessarily directed to the cleaning problem, while the automatic or self-cleaning arrangements proposed for pre-ionizing air cleaners specifically have been so unsatisfactory that manufacturers and users have found it necessary, from a practical standpoint at least, to resort to manual cleaning methods involving "shut downs."

After seriously considering the cleaning problem from time to time during the past several years, we finally conceived that it might be entirely eliminated, and a highly practical electrical gas cleaner produced, simply by applying the pre-ionizing method to an automatic or self-cleaning viscous-impingement air filter of the well-known spaced-plate type, and such forms the principal object of our invention.

Another important object of the invention is to provide a self-cleaning viscous-impingement air filter having an upstream pass which functions as a mechanical air cleaner, and a downstream pass which functions as an electrical precipitator.

Once the idea of applying the pre-ionizing method to automatic viscous-impingement filters is grasped, it will be readily appreciated that such method may be applied to various types of such filters. Since we have also found that such method may be advantageously applied to a two-pass filter, an application of that character is illustrated in the accompanying drawings, wherein:

Figures 2 and 3 are top plan and side elevational views of corresponding link portions of a conveyor chain;

Figure 4 is a section through line 4—4 of Figure 3;

Figure 5 is a perspective of a filter cell;

Figure 6 is a perspective of the molding forming a part of each cell;

Figure 7 is a fragmentary end view of a cell with the end plate removed;

Figure 8 is a section through line 8—8 of Figure 7;

Figure 9 is a horizontal section taken through line 9—9 of Figure 1;

Figure 1:
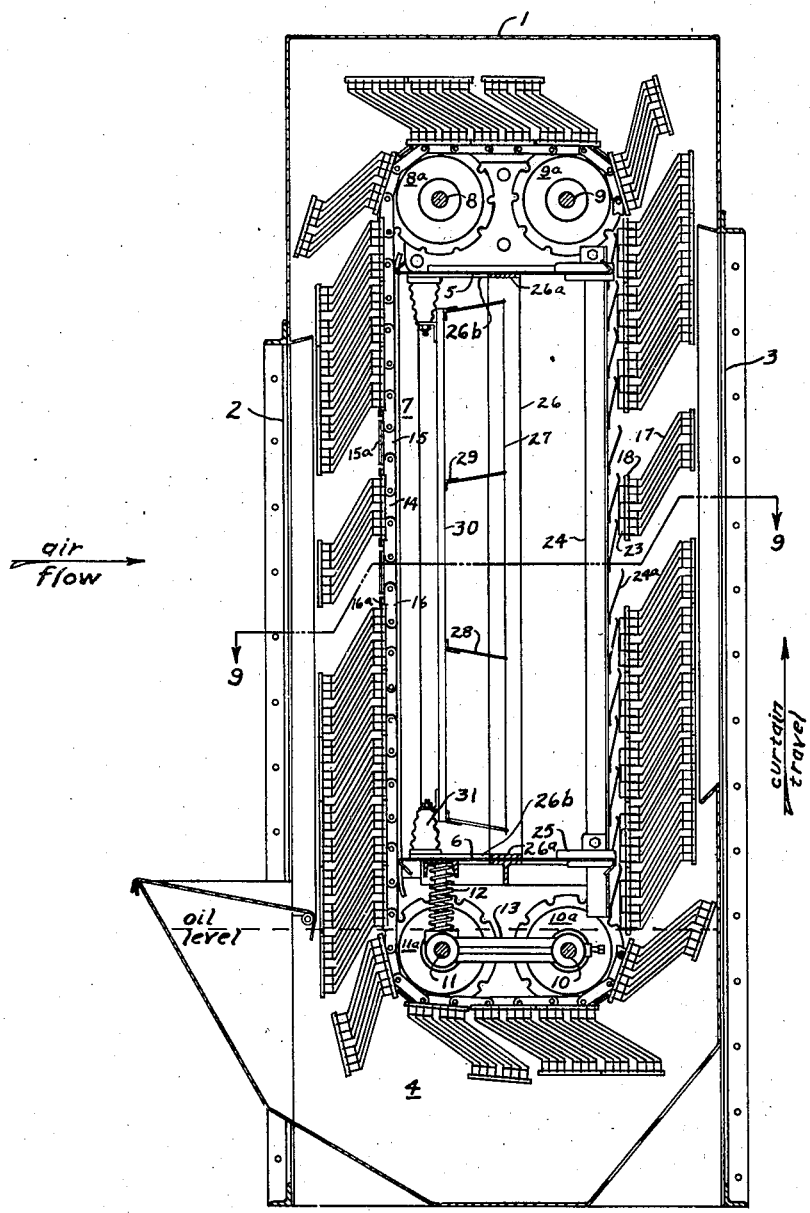
Figure 1 is a vertical sectional view taken centrally through a two-pass structure, two spaced cells in each pass and the conveyor chain adjacent one pass all being omitted for the sake of clearness.
Figure 10:
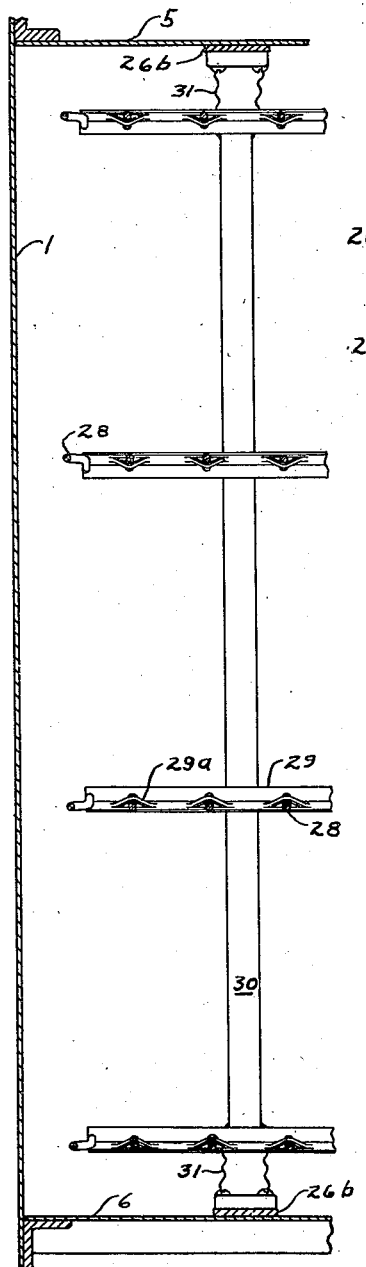
Figure 10 is a fragmentary section along line 10—10 of Figure 9.
Figure 11:
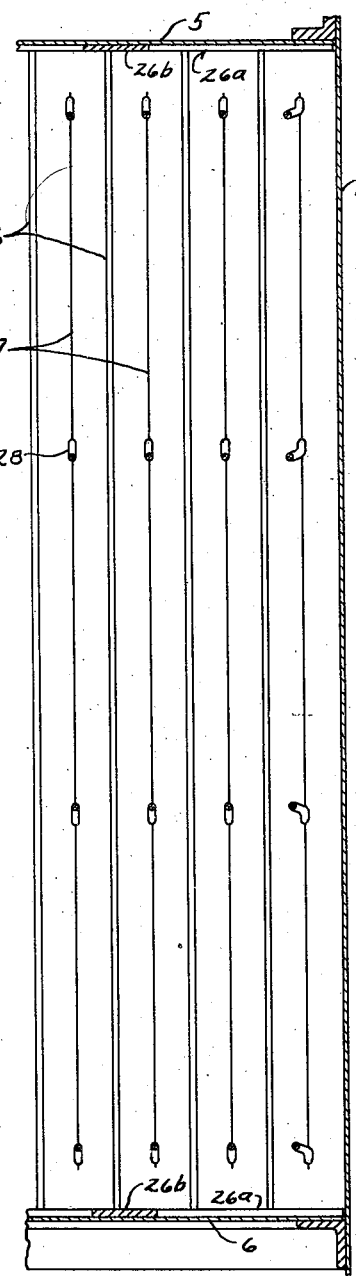
Figure 12:
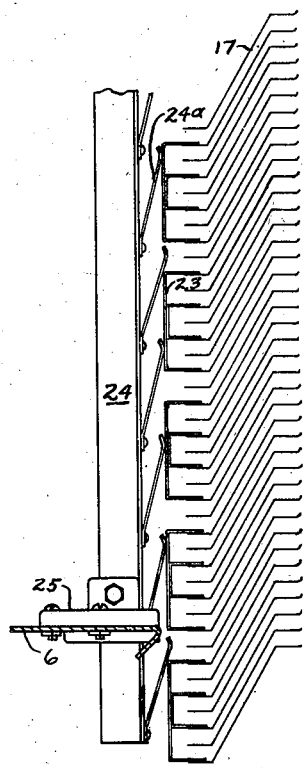

Figures 11 and 12 are fragmentary sections along lines 11—11 and 12—12, respectively, of Figure 9.

The filter illustrated comprises: a housing, preferably composed of sheet metal; an upright conveyor mounted within the housing; and a filter medium mounted on the conveyor. The housing or casing 1 is of conventional form having a front inlet opening 2 adjacent the upstream pass area, a rear outlet opening 3 adjacent the downstream pass area, and a bottom oil bath 4. It also contains, between pass areas, a centrally arranged ionizing chamber defined by its side walls in cooperation with transversely extending, horizontally arranged top and bottom metal partitions 5 and 6. An angle iron conveyor guide 7 is vertically arranged along opposite margins of each pass area, each conveyor guide being rigidly secured to the adjacent side wall of the housing. The upper and lower ends of each guide may be curved slightly to conform to the conveyor path.

The upright conveyor includes suitable shafts, sprockets and sprocket chains. The shafts comprise a pair of horizontally spaced, transversely arranged upper shafts 8 and 9 positioned above the top partition 5, and a similarly arranged pair of lower shafts 10 and 11 positioned below the bottom partition 6. The upper shafts 8 and 9 and the lower shaft 10 are all rotatably mounted on suitable bearings (not shown) which are rigidly secured to the housing 1. The other lower shaft 11 is a floating shaft. It is resiliently urged downwardly by one or more springs 12 suitably mounted between the shaft 11 and the bottom partition 6. The proper spacing between lower shafts 10 and 11 is maintained by a radius rod 13 which extends from one shaft to the other and is pivotally mounted on both. Each shaft carries a pair of laterally spaced sprockets, one adjacent each side of the housing. The sprockets of each pair is designated by the corresponding shaft numeral followed by the letter "a"; viz, 8a, 9a, 10a and 11a. The sprockets conventionally cooperate to carry a pair of sprocket chains 14, each sprocket being suitably notched to engage the corresponding chain.

The conveyor chains 14 extend along opposite sides of the housing and over the outer faces of the adjacent conveyor guides 7. Each chain is composed of an endless succession of alternate links and another series of intermediate links pivotally secured to each other. The structure and arrangement of each link is illustrated in Figures 2-4 inclusive. As illustrated, each alternate link includes a pair of laterally spaced straps 15, and each intermediate link, a similar pair of straps 16. The outer edge of one strap in each link is extended or flanged outwardly and thence laterally over the chain proper to form a securing lug 15a on alternate links and a lug 16a on intermediate links. The lugs 15a may be tapped or otherwise provided with a threaded opening to receive the securing means for the filter medium. Intermediate or connecting links are made wider than alternate links and are telescopically fitted over and pivotally secured thereto.

The filter medium is composed of electrically separate, narrowly spaced elements which cooperate to define along the medium a plurality of narrow gas passages extending through the medium. The elements, preferably, take the form of an endless succession of spaced metal filter plates 17, preferably of modified zigzag shape. The alternate plates form one series, and the intermediate plates another. The plates may be separately mounted upon the conveyor chains, but, preferably, are rigidly mounted in groups of eight to form filter cells, the cells, as a whole, being mounted on the chains. The structure of each cell is illustrated in Figures 5-7 inclusive.

As indicated, each cell includes four alternate and four intermediate plates or two pairs of each. To secure these plates together as a unit, to maintain the proper spacing between them and, for electrical-precipitation purposes, to insulate the intermediate from the alternate plates, four insulator moldings 18 are provided, one along each end margin of each air-flow face of the cell. Each molding 18, which traverses the air-flow edges of successive filter plates, is integrally provided with two spacer blocks 19, one for each pair of alternate plates, and with two spacer blocks 20, one for each pair of intermediate plates, the blocks 20 being offset both laterally and longitudinally from the blocks 19. Each block projects into, and traverses the space between, the corresponding pair of plates. Each pair of plates is mechanically secured to each of its spacer blocks, and preferably electrically connected to each other, by means of a bolt passing from one plate to the other through the corresponding block. To accommodate the spacer blocks 19 of the alternate plates, the intermediate plates are made shorter than the alternate plates. Likewise, to accommodate the spacer blocks 20 of the intermediate plates, the interposed alternate plates are suitably notched.

While the cells may be mounted on the conveyor in any suitable way, each cell, preferably, is mounted upon corresponding links of the conveyor chain by providing it with an end plate 22 at each of its ends, and by securing both end plates to the securing lugs 15a on corresponding links. Accordingly, the end plates 22 are mechanically secured to the longer alternate plates of each cell, by welds or otherwise, and, to the securing lugs 15a, by bolts or otherwise. In each case, the securing means, preferably, electrically connects the parts. In this way, the alternate plates are electrically connected to each other and to the conveyor chain which may be, and preferably is, grounded. While the individual plates of each intermediate pair may be electrically connected to each other through the spacer-block bolts, all of them, preferably, are electrically connected together, as a unit, by crossover straps 23 which project centrally from the intermediate plates, through that air-flow face of the cell which lies adjacent the conveyor, the straps forming a common collector bar. With this arrangement, the precipitator plates may be electrically charged by impressing suitable voltages between ground and the collector bars of each cell.

The viscous-impingement air filter of the two-pass type is admirably adapted for use as a preionizing electrical precipitator because the upstream and downstream sections of the filter medium may be advantageously used respectively as mechanical precleaners and electrical precipitators, while the space between passes may be used as an ionizing chamber. While this arrangement is preferred and illustrated, it is to be strictly understood that all or any proper section of the plates may be charged and the ionizer placed either between passes or in advance of the upstream pass. Accordingly, a precipitating voltage need be maintained only across such plates as are in the air-cleaning section of the downstream pass. To connect the intermediate plates of that section to one side of the precipitator voltage supply line, a bus bar 24 is vertically mounted on the casing to extend centrally in front of the downstream pass. The bus bar 24 is secured at its upper and lower ends to insulators 25 which are mounted on the top and bottom partitions 5 and 6 of the ionizing chamber. The bar carries a series of spring-metal bushes 24a positioned to have sliding contact with the collector bars 23 of the cells.

The ionizer may be and, preferably, is arranged to extend vertically across the center of the ionizing chamber. It includes two series of (large and small) electrodes 26 and 27 which, preferably, are charged to produce negative ionization, although they may be reversely charged when desired. The large negatively-charged electrodes 26 are in the form of vertical bars or strips of metal. They are welded or otherwise connected to top and bottom strips 26a to form a unitary "negative" grid. This grid may be welded or otherwise secured to the walls of the ionizing chamber. The small positively-charged electrodes 27 are in the form of fine wires. They are centrally positioned within the openings of the grid to extend vertically and centrally between negative electrodes 26, but to terminate at a suitable distance from the top and bottom strips 26a of the grid. Each wire electrode 27 is secured, at its ends and intermediate its ends also, to metal stems 28 which extend upstream, the wires passing through a groove in the end of each stem. The positive wire electrodes are held in position by means of an insulated framework to which the stems are secured and from which they project.

The insulated framework comprises a series of horizontally arranged, vertically spaced, angle iron members 29, one for each level of connecting stems, and a pair of vertically arranged, horizontally spaced, channel members 30 which are welded or otherwise rigidly connected to the angle iron members to form another unitary "positive" grid. The horizontal angle iron members present shelves which have raised loop-forming portions 29a struck therefrom to provide stem-receiving recesses within which the stem may be placed and clamped. The vertical channel members 30 of the positive grid are connected to insulators 31 at their upper and lower ends. This grid may be secured, through such insulators, upon the top and bottom partitions 5 and 6 of the ionizing chamber. Preferably, however, the positive grids are rigidly secured to the negative grid by mounting the insulators 31 upon connecting straps 26b which are formed integrally with to project from the top and bottom strips 26a of the bottom grid. With this arrangement, the ionizer may be assembled into a grid unit and then accurately positioned and rigidly secured, as a unit, within the ionizing chamber. Naturally, when installed, the electrodes may be charged simply by connecting positive and negative grids to the positive and negative sides of the ionizing voltage supply line.

In operation, a precipitating voltage, of say 5,000 to 6,000 volts, may be applied to the plates in the downstream pass, while an ionizing voltage, of say between 11,000 and 13,000 volts, may be applied between the positive and negative grids of the ionizer. The conveyor may be moved in the direction indicated, in accordance with usual practice, about ¾" every 12 minutes, by a suitably controlled drive mechanism (not shown). As the plates are thus made to pass downwardly through the upstream pass, they will function mechanically to preclean the air and thus remove a large proportion of the particles contained in the air. At the bottom of the conveyor, the cells hang downwardly into the oil bath in more or less separated relation. The oil functions to remove the precipitated dirt or dust and recoat the plates. As the cells emerge from the bath, they swing back into proper filtering relation, and, in this relation, pass upwardly into and through the downstream pass. As they approach such pass, they become charged with the precipitating voltage through the engagement of the bus bar brushes 24a with the collector bars 23 of the cells. The brushes are so spaced that contact is maintained with the collector bars 23 at all times during their travel through the air-cleaning section of the downstream pass. Consequently, the plates in such section are electrically conditioned, at all times, to precipitate the dust particles contained in the air passing between them. As the air passes through the mechanical precleaner section of the upstream pass, it enters and passes through the ionizing chamber. As a result, the air is ionized and the dust particles, therefore, charged before they enter the electrical precipitator section of the downstream pass. Any particles once precipitated in the downstream pass will be firmly bound to the precipitator plates by the fresh coating of oil which they received during their passage through the bath. They will, therefore, be ultimately carried into the oil bath and there removed in the usual way.

Having described our invention, we claim:

1. An electrical gas cleaner comprising: A filter medium composed of electrically separate narrowly spaced elements which cooperate to define along and across the medium a series of narrow gas passages extending through the medium;

means for moving the medium along a path having gas-cleaning and filter-cleaning sections; means for establishing an electrostatic precipitating field in the gas passages between elements in the gas-cleaning section; and liquid-bath means for cleaning precipitated matter from the elements in the filter-cleaning section.

2. An electrical gas cleaner comprising: A filter medium composed of at least one alternate and one intermediate series of narrowly spaced filter plates, the alternate plates cooperating with the intermediate plates to define along and across the medium a series of narrow gas passages extending through the medium; means for insulating the alternate series from the intermediate series; means for moving the medium along a path having gas-cleaning and filter-cleaning sections; means for establishing an electrostatic precipitating field in the gas passages between alternate and intermediate plates in the gas-cleaning section; and liquid-bath means for cleaning precipitated matter from the plates in the filter-cleaning section.

3. An electrical gas cleaner comprising: A casing having a bottom filter-cleaning bath, a gas passageway above the bath and a pass area extending across said passageway; a filter medium mounted on the casing for movement through said bath and pass area, said medium being composed of at least one alternate and one intermediate series of narrowly spaced filter plates, the alternate plates cooperating in said pass area with the intermediate plates to define along and across the medium a series of narrow gas passages extending through a medium; means for insulating the alternate series from the intermediate series; means for moving the medium so that the plates thereof successively approach, pass through and leave said pass area; and means for establishing an electrostatic precipitating field in the gas passages between alternate and intermediate plates in said pass area.

4. The structure defined in claim 3, wherein the field establishing means includes: Means for electrically connecting the approaching plates, and disconnecting the leaving plates, automatically to an electrical power supply.

5. The structure defined in claim 3 wherein the field establishing means includes: Crossover straps connecting successive groups of plates of one series electrically to each other; and means for electrically connecting the straps of approaching groups, and disconnecting the straps of leaving groups, automatically to an electrical power supply.

6. An electrical gas cleaner comprising: a casing having a bottom filter-cleaning bath, a gas passageway above the bath, upstream and downstream pass areas extending across said passageway, and an ionizing chamber in advance of the downstream pass-area, a filter medium mounted on the casing for movement along a path extending from said bath, upwardly through one pass area and downwardly through the other back to said bath, said medium being composed of at least one alternate and one intermediate series of narrowly spaced filter plates, the alternate plates cooperating in each pass area with the intermediate plates to define along and across the medium a series of narrow gas passages extending through the medium; means for insulating the alternate series from the intermediate series; means for moving the medium so that the plates thereof successively approach, pass through and leave each pass area; means in said ionizing chamber to charge electrically the gas-borne dust particles passing therethrough; and means for establishing an electrostatic precipitating field in the gas passages between plates in the downstream pass area.

7. The structure defined in claim 6, wherein the field-establishing means includes: An electrical power-supply member insulatedly mounted on the casing; and means for maintaining an electrical connection between the plates of one series and said power-supply member during their travel through the downstream pass area, between one point intermediate said area and the bath, and another point intermediate said area and the upstream pass area, said plates being electrically disconnected during their travel through the upstream area from one of said points to the other.

8. In a gas filter of the spaced-plate type, wherein an endless succession of narrowly spaced, gas-filtering plates are mounted on an endless upright conveyor to form a two-pass viscous-impingement gas-filtering belt extending vertically across the air flow with its lower end submerged in a plate-cleaning bath, the combination of: Means for electrically insulating alternate plates from intermediate plates; means for establishing an electrostatic ionizing field in advance of the downstream pass, and means for establishing an electrostatic precipitating field between plates in the downstream pass.

9. An apparatus for the purpose described including: a framework; a continuous belt-type screen-curtain structure rotatably carried by the framework and composed of a plurality of interlinked units, each made up of a plurality of spaced metallic plates; means for rotating the curtain; a tank of viscous material located so the lower part of the curtain passes through said viscous material; and ionizing means located between the up-and-down-going portions of the belt type curtain; means for electrically charging the plates of the curtain units on the air-outgoing side of the curtain; said curtain and ionizing means being arranged so that the air to be cleaned passes first through an uncharged portion of the curtain, then through the ionizing means, and finally through the charged portion of the curtain.

10. An apparatus for the purpose described including: a framework; an endless curtain structure rotatably mounted on the framework with means for rotating the curtain, the curtain being composed of a plurality of spaced metallic-plate units interlinked at their opposite ends so as to receive a part of said rotating means thereat; means for electrically charging the plates of said units at least on one side of the curtain; and means for subjecting the lower units of the curtain to a treatment by oil of suitable viscosity for the purpose described; the curtain and framework being arranged so that air may be forced through the structure, passing first through one side of the curtain and out through the other side thereof.

11. The apparatus defined in claim 10 wherein an ionizing means is located between the up-and-down-going sides of the curtain to act upon the air passing therebetween.

12. The apparatus defined in claim 10 wherein an ionizing means is located between the up-and-down-going sides of the curtain to act upon the air passing therebetween, said ionizing means comprising: a series of metallic grounded electrodes arranged in spaced relation longitudinally of the apparatus and electrical conductors spaced between and generally parallel to the grounded electrodes and adapted to be charged to a potential which will ionize the particulate matter in the air passing by them.

13. An apparatus for the purpose described including: a framework; an endless curtain structure rotatably mounted on the framework in a vertical position to receive air at one side and discharge it on the other; operating shafts near the top and bottom of the structure; sprocket wheels at the ends of each shaft; the curtain being composed of a plurality of units made up of spaced plates, the units being interlinked with means cooperative with said sprocket wheels; power means associated with at least one of said shafts to rotate the curtains; an ionizer located relatively to the curtain to act on the air in advance of the discharge side of the curtain; means for electrically charging opposed plates of the said units on at least one side of the curtain for the purpose described; and means for cleaning the plates of the units between the down-going and upgoing portions thereof.

14. The apparatus defined in claim 13 wherein the plate cleaning means includes a bath of viscous liquid located at the bottom of the curtain structure so that the units are moved therethrough in passing from one side of the curtain to the other.

15. Means for cleaning air including: a housing structure; an endless curtain carried within the structure with means for rotating the curtain, the curtain being composed of a plurality of interlinked units made up of spaced plates; means for treating the plate with a suitable viscous liquid in one stage of movement of the plates; means for electrically charging the plates directly after being treated with said liquid and through their upward passage in the structure; means for grounding the plates during their downward movement in the structure; the curtain being adapted to receive air first through its downwardly moving side and then through its upwardly moving side; and means for ionizing the air stream as it passes between the down and up moving sides of the curtain.

HOWARD W. POUND.
MERLE K. RUSH.